US007158525B2

(12) United States Patent
Daffner et al.

(10) Patent No.: US 7,158,525 B2
(45) Date of Patent: Jan. 2, 2007

(54) APPARATUS AND PROCESS FOR DATA COMMUNICATION, IN PARTICULAR FOR THE PARAMETERIZATION AND REMOTE MONITORING OF HEATING INSTALLATIONS

(75) Inventors: Klaus-Josef Daffner, Oberursel (DE); Gerhard Heinmöller, Neustadt (DE); Jörg Hoffmann, Allendorf (DE); Andreas Ciliox, Eschenburg (DE)

(73) Assignee: Viessmann Werke GmbH & Co., Allendorf (DE)

( * ) Notice: Subject to any disclaimer, the term of this patent is extended or adjusted under 35 U.S.C. 154(b) by 834 days.

(21) Appl. No.: 10/085,817

(22) Filed: Feb. 26, 2002

(65) Prior Publication Data
US 2002/0120671 A1    Aug. 29, 2002

(30) Foreign Application Priority Data
Feb. 26, 2001    (DE) .............................. 101 09 196

(51) Int. Cl.
*H04L 12/28* (2006.01)
*G01R 23/00* (2006.01)

(52) U.S. Cl. ...................... 370/401; 370/466; 370/310; 370/402; 340/870.02; 340/770.11; 340/870; 340/539; 709/203

(58) Field of Classification Search ........ 709/203–207, 709/217, 219, 238; 341/141; 710/14; 370/330, 370/335, 401
See application file for complete search history.

(56) References Cited

U.S. PATENT DOCUMENTS

| 5,793,646 A | 8/1998 | Hibberd et al. ............. 364/505 |
| 6,559,783 B1 * | 5/2003 | Stoneking .................... 341/141 |

(Continued)

FOREIGN PATENT DOCUMENTS

| DE | 19841476 | 3/2000 |
| WO | WO 00/46965 | 8/2000 |
| WO | WO 00/56016 | 9/2000 |

(Continued)

OTHER PUBLICATIONS

"The Internet Access To The LON Worldwide Access To The Sensor And Actor Equipment Of Automation Projects" Tilo Klesper, Bd. 47, Nr. 8, Apr. 14, 1998, Seite 60, 62, 64, 66, XP000780190.

(Continued)

*Primary Examiner*—David Wiley
*Assistant Examiner*—Jude Jean-Gilles
(74) *Attorney, Agent, or Firm*—Perman & Green, LLP.

(57) ABSTRACT

The invention relates to an apparatus and a process for the data communication between a system unit (8) and technical facilities (2, 3, 4) in buildings for the flexible and convenient parameterization and remote monitoring of the facilities (2, 3, 4), an existing communication infrastructure being usable to reduce the expenditure resulting from cabling and to enable cost-effective data communication. The apparatus comprises a system unit (8) which is suited for data transmission according to a first data transmission protocol, at least one facility (2, 3, 4) which is suited for data transmission according to a second data transmission protocol, a protocol converter (1) which is connected to system unit (8) and converts data of the first data transmission protocol into data of the second data transmission protocol and vice versa, and a bus system (5) to which the facilities (2, 3, 4) and the protocol converter (1) can be connected.

19 Claims, 5 Drawing Sheets

U.S. PATENT DOCUMENTS

| | | | |
|---|---|---|---|
| 6,606,670 B1 * | 8/2003 | Stoneking et al. | 710/14 |
| 6,799,202 B1 * | 9/2004 | Hankinson et al. | 709/219 |
| 6,891,838 B1 * | 5/2005 | Petite et al. | 370/401 |

FOREIGN PATENT DOCUMENTS

WO     WO 00/67140     11/2000

OTHER PUBLICATIONS

"Fieldbuses In Measurement and Control" Harald Schumny, Bd. 19, Nr. 5-6, Oct. 15, 1998, Seiten 295-304, XP004144063.

* cited by examiner

APPARATUS AND PROCESS FOR DATA COMMUNICATION, IN PARTICULAR FOR THE PARAMETERIZATION AND REMOTE MONITORING OF HEATING INSTALLATIONS

BACKGROUND OF THE INVENTION

1. Field of the Invention

The invention relates to an apparatus and a process for the data communication between a system unit and technical facilities in buildings for the flexible and convenient parameterization and remote monitoring of the facilities, an existing communication infrastructure being usable to reduce the expenditure resulting from cabling.

2. Brief Description of Prior Developments

For their operation today's heating installations require a plurality of parameters which have to be set when the installation is commissioned and have to be monitored while it is operated. In particular in the case of major heating installations, a plurality of different facilities is distributed over various locations, e.g. on a plant site. For example, the data of burners, heat pumps, heat counters and a plurality of temperature sensors have to be detected to control a heating installation. A house or field bus is usually used for the data transmission connection of all of these facilities. The data necessary for the automatic control of a heating installation can be transmitted between the various facilities using such a bus system, which is installed within a building, for example. A number of such usually manufacturer-based bus systems is known.

However, the use of these special house or field bus systems is usually limited to a single building. House or filed bus systems are not suited for large installations which are distributed over several locations and shall be maintained and monitored by a central control station.

A house bus system, e.g. for networking a multiple boiler plant, also requires special cabling, which usually implies considerable expenditure as regards the building installation. Special maintenance and configuration terminals for connection to the particular house bus system are also necessary. The plurality of different house bus systems can result in a major additional expenditure as regards cabling and the devices to be held in store. Yet, a communication infrastructure, usually in the form of telephone and data transmission cabling, already exists in most office buildings and company premises.

It is an object of the present invention to create an apparatus and a process for the data communication between facilities, in particular heating, air conditioning and/or cooling installations, and a system unit, which enables the flexible and convenient maintenance, parameterization and remote monitoring of the facilities. In particular, it shall be possible to use an already existing communication infrastructure to reduce the expenditure resulting from necessary cabling and to enable cost-effective data communication.

The object is achieved by the features of the independent claims. The dependent claims describe advantageous embodiments and further developments of the invention.

SUMMARY OF THE INVENTION

According to the invention an apparatus for data communication, in particular for the parameterization and remote monitoring of heating installations, can comprise a system unit, at least one technical facility for use in buildings, a protocol converter and a bus system. Using such an apparatus, a plurality of different technical facilities used in buildings can easily be monitored and maintained by the system unit, it being possible to employ an existing communication infrastructure to reduce the expenditure resulting from cabling.

The system unit can be used for data transmission according to a first data transmission protocol. The system unit may comprise a software for the parameterization and remote monitoring of the facilities and may be arranged in a central control station for the monitoring and remote maintenance of heating installations. However, it may also be a mobile device used in situ to parameterize and maintain a heating installation. The software used by the system unit, the user interface for handling and the kind of data transmission may, however, be identical in both cases.

The facilities are suited for data transmission according to a second data transmission protocol. As a result of the data transmission between the facilities and the system unit, the facilities can be parameterized and monitored. The facilities of the apparatus can be arranged in spatially integrated fashion, e.g. in a mounting frame or a built-in cabinet, or they may be distributed over different locations, e.g. in a building. A plurality of different facilities can be parameterized and monitored in this way.

The protocol converter converts data of the first data transmission protocol into data of the second data transmission protocol and vice versa. It is connected to the system unit via a data transmission connection, for example. The protocol converter converts the data, received from the system unit, of the first data transmission protocol into data of the second data transmission protocol. On the other hand, the protocol converter converts data, received from the facilities, of the second data transmission protocol into data of the first data transmission protocol. The protocol converter may be a spatially independent device or be integrated with other facilities of the apparatus in a mounting frame or built-in cabinet. The protocol converter connects the bus system to the system unit and effects the electric and logical adaptation between the bus system and data transmission connection to the system unit. The protocol converter can be made such that it can be adapted to a plurality of different bus systems and data transmission connections. It enables simple, flexible and modular connection of the system unit to different facilities and bus systems and permits a uniform design of the system unit and its software.

The bus system connects the facilities of the apparatus to the protocol converter. The bus system can be used for the data transmission between the individual technical facilities of the building among one another and to the protocol converter. The bus participants can transmit measurement data, exchange commands to control the installations and send messages for diagnostic purposes, for example. The facilities connectable to the bus system may be heating, air conditioning and/or cooling installations. Measuring or control units for operating heating, air conditioning and/or cooling installations may also be connected to the bus system. For example, heat counters and/or temperature sensors can be connected to the bus system. The facilities connected to the bus system can be parameterized, monitored and/or maintained easily and conveniently by the system unit. Using the protocol converter, the special and locally limited bus system can easily be connected to the general communication infrastructure. It is not necessary to provide special cabling between the facilities or the bus system and the system unit which is located at a major distance from the heating installations in a central control station, for example. On account of the protocol conversion, the system unit can be operated with different bus systems and the most varying facilities. The design and function of the system unit may be the same for the most differing heating installations, for example.

The bus system may be a house or field bus of various developments. The second data transmission protocol can be a LON protocol. The LON bus participants can communicate with one another and exchange data.

A protocol converter according to the invention may also have additional analog or digital inputs and outputs for the direct connection of facilities without the bus system. The digital inputs can detect the state of connected devices, for example. The analog inputs can preferably be provided to record measurement data, e.g. by connecting temperature sensors. Connected devices can be controlled by the outputs, e.g. relay outputs. Facilities which have no bus interface can be monitored and controlled via the direct inputs and outputs of the protocol converter by the inventive apparatus for data communication. For this purpose, the protocol converter may adopt the function of a virtual facility which is connected to the bus system and, like the other facilities, is remotely monitored, parameterized and controlled by the system unit.

The first data transmission protocol may be a protocol on the basis of the internet protocol IP. In particular, the Simple Network Management Protocol SNMP, the Hypertext Transport Protocol HTTP, the Transport Control Protocol TCP or the LonWorks Network Protocol are possible transport protocols. The use of these standard protocols as first data transmission protocols of the apparatus enables a simple and cost-effective development and production of the apparatus. These protocols can be used for data transmission in connection with many networks, e.g. in Local Area Networks LAN with Ethernet, Tokenring or glass fiber connections, and also for the remote data transmission, e.g. via telephone lines.

The protocol converter can retrieve data from the facilities at given intervals, store them, send them to the system unit and/or hold them in store for inquiry by the system unit. The predetermined data and the given intervals for the inquiry thereof can be set for the specific installation by the manufacturer or operator of the installation when the protocol converter is configured. For example, a list regarding the facilities to which an inquiry is to be made and the data to be retrieved can be set up when the protocol converter is configured. These data may be data concerning the installation such as the setting of the operation and configuration data of the devices, trouble reports, process data, maintenance data and/or measurement data of heat counters, for example. The protocol converter can store the retrieved data and hold them in store for inquiry by the system unit, for example. The protocol converter can also send independently data to the system unit without waiting for the system unit to make an inquiry. This can be done in particular when the retrieved data contain failure or alarm reports pointing to a faulty state of a facility or other extraordinary events. The facilities can also send independently messages to the protocol converter, which are passed on to the system unit by the protocol converter or are buffered and are held in store by the system unit for the purpose of inquiry. The protocol converter serves for connecting all of the facilities connected to the bus system to the system unit. It collects the data sent by, or retrieved from, the facilities, evaluates them and passes them on to the system unit.

The protocol converter can have a memory for the data retrieved from, or sent by, the facilities. For example, the configuration data and operating conditions of the facilities, maintenance, trouble or diagnostic reports can be stored in this memory. The stored data are ready for inquiry by the system unit. The data requested by the system unit can thus be transmitted directly to the system unit without an inquiry having to be made to the corresponding facility beforehand to ascertain the desired data. The individual data can also be combined and transmitted to the system unit as major data packets, which increases the efficiency of the data transmission to the system unit and can reduce the cost of data transmission.

The protocol converter can send data received by the system unit and meant for a certain facility via the bus system to the corresponding facility. The protocol converter receives e.g. commands for a heating installation and passes them on to the corresponding facility. Here, several commands can also be transmitted advantageously and jointly as a data packet of the first data transmission protocol from the system unit to the protocol converter. The protocol converter can separate the different commands of the received data packet and pass them on to the individual facilities. In the opposite direction, e.g. many individual measurement data from different facilities can be combined into a data packet and be transmitted from the protocol converter to the system unit via the first data transmission protocol. This serves for markedly reducing the expenditure required for the data transmission between system unit and protocol converter.

The data transmission between protocol converter and system unit can be protected from unauthorized monitoring by means of data encryption, for example. The retrieval of data and transmission of commands can also be protected from unauthorized use by means of cipher key or access code exchange. For example, it is also possible to only allow access of a certain system unit, determined when the protocol converter is configured, to the protocol converter. In this way, only registered and authorized systems and/or users can get access to the facilities.

The protocol converter can activate a predetermined connection and/or send a given message when one of the facilities sends a trouble or maintenance report. In particular, the protocol converter can send a facsimile message, an e-mail, an SMS message or a voice message to a predetermined receiver. If the protocol converter retrieves or receives a trouble or maintenance report from one of the facilities, the protocol converter can try to connect to the system unit to pass on the message. If this is not possible for various reasons, e.g. because the system unit or the data transmission connection to the system unit has failed or is disturbed, the protocol converter can activate a certain emergency connection following a certain number of attempts. For example, the protocol converter can connect to another system unit or send a given facsimile message, an e-mail, a voice message or an SMS message. On account of this message, the competent operating personnel in the control station can be informed of the trouble report of the facility and/or the trouble of the data transmission connection or the trouble of the system unit. A predetermined user can also be informed of the problem by a facsimile message, an e-mail or an SMS message. This is of particular interest for the operators of relatively small installations, who have no constantly staffed control station. In this way, the operating personnel can be alarmed in cost-effective manner and easily, e.g. at home.

According to the invention, the connection between the protocol converter and the system unit can be established via an analog and/or digital telephone line. The connection may comprise an analog modem, a GSM modem or an ISDN modem, for example. The data transmission connection can be established via a private and/or public network in cost-effective manner. The connection between protocol converter and system unit can be established permanently or be set up and disconnected as desired. The connection can be set up and disconnected by both protocol converter and system unit. In this case, it is possible to provide both direct modem connection between the modem of the protocol converter and the modem of the system unit and a connection between protocol converter and system unit via the internet. In the case of an internet connection e.g. the modem of the protocol converter dials a local dial-in number of an internet provider and establishes a temporary internet connection to the system unit. In this way, installations arranged as desired (protocol converter and facilities) can communicate with the system unit in cost-effective manner and be monitored and controlled by it. The cost of connection can thus be reduced when installations distributed world-wide are operated.

Furthermore, in the case of a temporary connection between system unit and protocol converter the cost of transmission can markedly be reduced by the inventive storage of the retrieved data of the facilities. For example, the protocol converter makes an inquiry to the facilities at given intervals and ascertains the predetermined data to be transmitted to the system unit. Having ascertained all given data, the protocol converter can connect to the system unit, transmit the data jointly and disconnect the connection to the system unit. However, the system unit can also connect to the protocol converter, retrieve the necessary data therefrom and disconnect the connection.

The connection from system unit to protocol converter can also be set up using a call-back procedure. The system unit sends a short signal or a call-back request to the protocol converter whenever it wants to transmit data thereto or retrieve data therefrom. The protocol converter then calls back a given call-back number to set up a data transmission connection to the system unit. Since the actual data transmission connection is always established from protocol converter to system unit, a foreign system cannot transmit data to the protocol converter or retrieve data therefrom. Unauthorized access to the protocol converter is prevented, which adds to the security of the apparatus for data communication.

In an embodiment, the protocol converter and the system unit may have one or more RS-232 interfaces, for example. In this way, analog or ISDN modems can easily be used for setting up the data transmission connection between the protocol converter and the system unit. Protocol converter and system unit can also be connected directly with each other by a null modem cable or via an optical interface, in particular an optolink interface. This is of special benefit to the in situ diagnosis and maintenance by the customer service. For example, the system unit can be a suitable portable computer which is connected to a protocol converter in the vicinity of the heating installation. As a result of the apparatus according to the invention, both control station and portable in situ computer can use the same software for parameterizing and monitoring heating installations.

Another possibility for the data transmission connection between system unit and protocol converter consists in the direct connection of both devices to a LAN data network. For example, the protocol converter can be connected to an Ethernet via a LAN coupler. The system unit can be connected to the data transmission network via a common Ethernet network connector. This enables a simple and cost-effective connection via a data transmission network which might already exist.

The system unit can connect to the protocol converter at given intervals and retrieve predetermined data. The predetermined data were retrieved by the protocol converter from the facilities beforehand and buffered. The system unit can in this way collect a relative large quantity of data of all facilities connected to the protocol converter via the bus system by a single inquiry. Connection set-up to each individual facility is not necessary. In this way, the data transmission costs can be reduced and the design of the system unit can be simplified. The connection can also be established via the call-back procedure in which the protocol converter dials a given call-back number upon receipt of a call-back message and connects to the system unit.

The system unit can connect to the protocol converter and send data for a certain facility to the protocol converter. Thereafter, the connection can immediately be disconnected again. The protocol converter evaluates the received data and passes on commands to the corresponding facilities. The system unit can connect to the protocol converter and retrieve/receive data on a certain facility from the protocol converter. Unless the data to be retrieved are already available in the memory, the protocol converter can contact the corresponding facility via the bus system, ascertain the data to be retrieved and transmit them to the system unit. The protocol converter enables a logical connection between the facilities of the bus system and the system unit. Data communication between the facilities and the system unit takes place via the protocol converter. The protocol converter can control the access to the data of the facilities, distribute or bundle/combine data and commands and control the connection set-up to the system unit.

The system unit can also connect to several protocol converters and transmit data to several facilities or receive them therefrom. It can send data for special facilities to the particular protocol converters and/or receive data of certain facilities from the particular protocol converters. For this purpose, the system unit sends e.g. data for a certain facility to the protocol converter which is connected to a bus system the same as that of the special facility.

The system unit may have a database which contains the configuration, commissioning, maintenance and operation data of the facilities and/or protocol converters. In particular, trouble and maintenance reports can be stored in the database. The database can contain control, configuration and operating data of the individual facilities. Process and measurement data, e.g. from heat counters or temperature sensors, can also be recorded. The database can advantageously also contain system data of the protocol converters, such as the type of the connected bus system, a list of the connected facilities and/or information on the employed modem types and their driving or driving configurations. In the system unit, access is possible to the current configuration, maintenance and operating data and to the most recent trouble and maintenance reports of facilities to be monitored, without a connection to the corresponding protocol converter and/or the corresponding facility having to be established. The database can contain the current state of the heating installations to be monitored, for example. The operating personnel can check the current state and optionally take steps to remedy troubles. Furthermore, the database can contain reference data and/or commissioning or servicing protocols for the monitored facilities.

The system unit can send a certain message if a certain trouble or maintenance report has been received from one of the facilities. In particular, the system unit can send a facsimile message, a voice message, an e-mail or SMS message to another system unit, e.g. in another control station, and/or to one or more predetermined operators to inform them of the receipt of a trouble or maintenance report. The messages can be passed on according to a given handling schedule which contains the corresponding services. Based on the time and installation, the handling schedule can comprise a duty and/or service schedule for each facility or for a group of facilities, indicating the kind of report which leads to a certain action for which facility at what time, e.g. passing on as SMS message. The actions to be performed can easily be adapted to the duty schedules of the operating personnel by the handling schedule. Furthermore, the system unit can perform previously defined tasks according to a definable time schedule to monitor e.g. facility data of certain heating installations.

The database of the system unit can be accessed via an internet server and/or a WAP server. The data of the system unit can be accessed by means of a WAP-compatible mobile telephone or a conventional internet browser via the internet by a correspondingly equipped personal computer. For example, the operation and maintenance conditions of the facilities to be monitored can be held in store by a web server for inquiry via the internet. This is particularly advantageous for the operating personnel of relatively small installations, who are not permanently in the control station. The competent maintenance personnel's attention can be drawn to a special trouble by sending an SMS message, for example. The operating personnel can eliminate this trouble from home via the internet and the web server or a WAP-compatible mobile telephone. A trip to the control station at night by the operating personnel can thus be avoided.

In a major control station or in a company having several control stations, each of several system units can advantageously connect to the protocol converters and or receive data from the protocol converters, or send data to the protocol converters. In this case, the system units can communicate with one another via the internet. In this way, a distributed system having several system units can easily be realized. The system units can be arranged in several control stations, for example. It is also possible to arrange a system unit in a head office and use another system unit in the form of a portable computer for an in situ diagnosis. The system units can be connected via the internet and exchange messages.

One of the system units may have a central database. The other system units can send data updates to this central database and/or collate their own database with the central database. This is of special advantage for a large system having several system units in a major control station or for several control stations and can be used for data saving and/or for protecting data consistency in case several users/ systems access the same data. The system unit which includes the central database can automatically collate the databases of the individual system units.

A process for data communication, in particular for the parameterization and remote monitoring of heating installations, may comprise at least one of the following steps: data transmission according to a first data transmission protocol between a system unit and a protocol converter; conversion of the data of the first data transmission protocol into data of the second data transmission protocol and vice versa by the protocol converter; and data transmission according to the second data transmission protocol between the protocol converter and at least one facility.

The apparatus according to the invention and the inventive process for data communication between a system unit and at least one facility via a protocol converter enables a simple and flexible design of complex heating, air conditioning and cooling installations. The parameterization and remote monitoring of the facilities can likewise be carried out in the control station by a system unit or in situ by a mobile system unit. The protocol converter enables the use of the most different bus systems for networking the facilities and operating a data transmission connection to the system unit via a communication infrastructure which might already exist. By buffering the data in the protocol converter, the cost of connection can be kept low in the case of a switched telephone connection to the system unit. The database of the system unit enables the operating personnel to directly access the current operating and configuration data of the facilities to be controlled.

BRIEF DESCRIPTION OF THE DRAWINGS

The following description of embodiments is made by means of the attached diagrammatic figures, in which.

DESCRIPTION OF THE PREFERRED EMBODIMENTS

Figure 1:
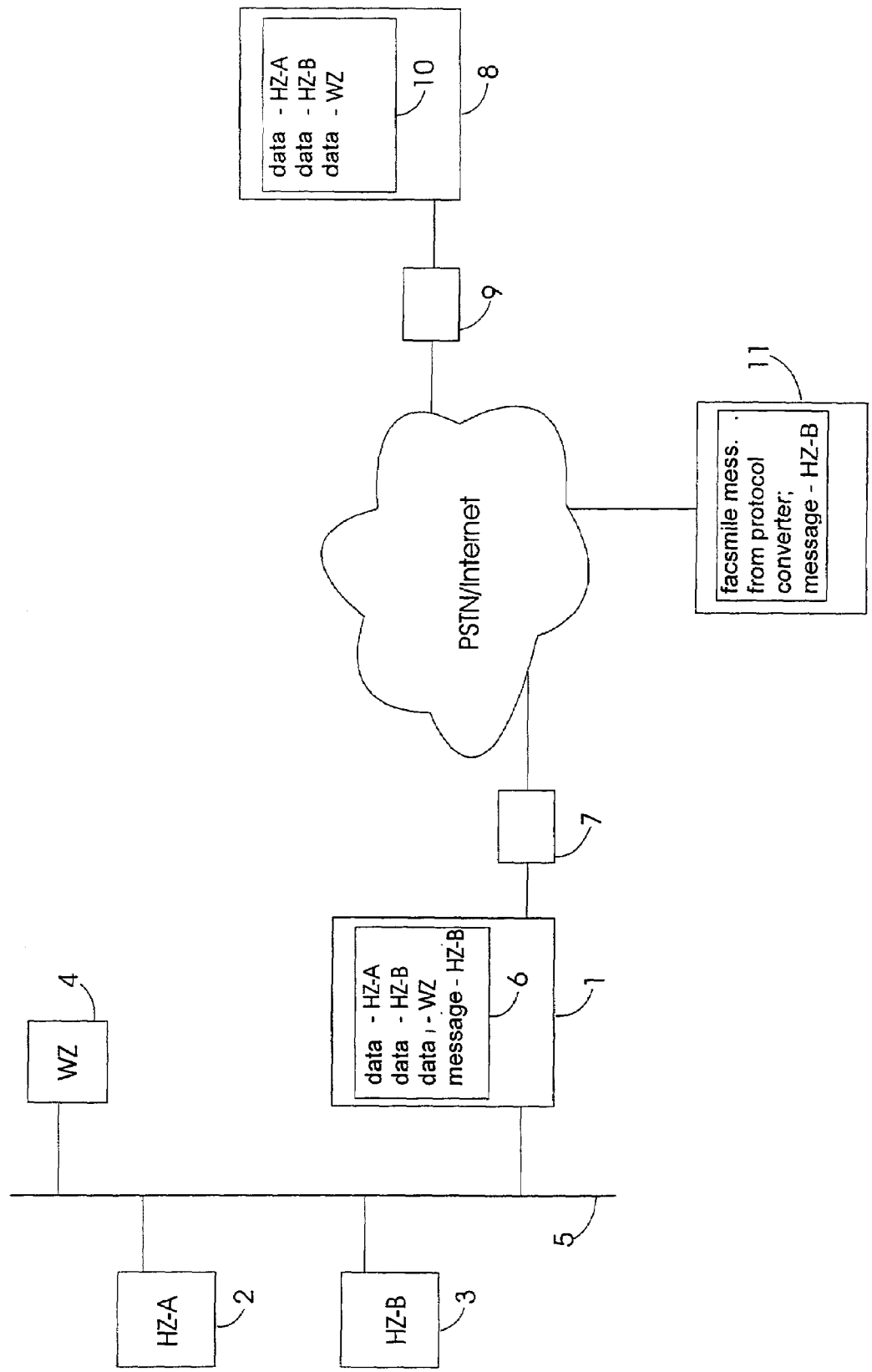
FIG. 1 shows a diagram of an apparatus according to the invention for data communication, in particular for the parameterization and remove monitoring of heating installations.

FIG. 1 shows a diagram of an inventive apparatus for data communication, in particular for parameterizing and remotely monitoring heating installations. The facilities to be monitored are in this embodiment a first heating installation HZ-A 2, a second heating installation HZ-B 3 and a heat counter ZW 4. Facilities 2, 3, 4 are connected to bus system 5. Bus system 5 is e.g. a LON house bus which is run in a building to control the technical installations of the building.

The protocol converter 1 is connected to both the bus system 5 and a modem 7. For this purpose, the protocol converter may comprise e.g. a LON bus interface, an optical interface (optolink interface) and an RS-232 interface. Modem 7 may be an analog telephone modem or an ISDN modem. Modem 7 is connected to a private or public telephone network via standard telephone cabling. In place of a wire-bound connection, wireless connection via a GSM modem can also be provided. Modem 7 is controlled by the protocol converter 1. The protocol converter 1 also has a memory 6 for storing retrieved data of the connected facilities 2, 3, 4 and for storing messages received from facilities 2, 3, 4.

A protocol converter 1 can also include analog or digital inputs and outputs for the direct connection of facilities without bus interface. For example, the states of connected devices or measurement data can be recorded through the inputs. The outputs, e.g. relay outputs, can be used for controlling connected devices. This enables the operation of relatively simple devices, such as temperature sensors, which have no bus interface. These devices can be monitored and controlled by the inventive apparatus for data communication via the inputs and outputs of the protocol converter 1. The protocol converter 1 takes over the function of a virtual facility which like the other facilities is monitored, parameterized and set by system unit 8 and which controls the directly connected devices.

The protocol converter 1 retrieves predetermined data from facilities 2, 3, 4 connected via the bus system 5 at given intervals and stores them in memory 6 designed for this purpose. In the example shown in FIG. 1, data were retrieved from the first heating installation HZ-A 2, the second heating installation HZ-B 3 and the heat counter WZ 4 and stored. The cyclic data inquiry can be made every 10 minutes, for example. The retrieved data can contain e.g. the operation and configuration states of the facilities to which an inquiry was made. In the example shown in FIG. 1, these data were retrieved at 7.55 a.m. from facilities 2, 3, 4, for example. The stored data are held in store in memory 6 by the protocol converter 1 for inquiry by system unit 8.

System unit 8 connects to the protocol converter 1 e.g. every hour and induces the transmission of the data stored by protocol converter 1. In the embodiment as shown, an analog or ISDN modem 9 is connected to system unit 8 and the telephone network for this purpose. A system unit 8 can also comprise several modems 9 to maintain several connections to the protocol converters at the same time. System unit 8 induces e.g. modem 9 to set up a switched connection to modem 7 and protocol converter 1. This can be done at given intervals or as required.

Furthermore, the call-back procedure can be used for establishing a safe connection between protocol converter 1 and system unit 8. The connection can be established as both a direct modem connection between modems 7, 9 (e.g. via the V0.34 or the V0.90 standard) and via an internet connection. For this purpose, modem 7, for example, dials a local dial-in number of an internet provider and connects to the system unit 8 which is connected to the internet via modem 9 or a LAN connection.

Having established the connection, the data stored in the protocol converter 1 are transmitted to system unit 8 where they are stored in a database 10. Having concluded the data transmission, the connection can be disconnected to reduce the costs of connection.

In the example shown in FIG. 1, the connection from system unit 8 to protocol converter 1 is established every hour, for example. The data stored in database 10 were transmitted from the protocol converter 1 to the system unit 8 at 8.00 a.m., for example. The protocol converter 1 retrieved these data from facilities 2, 3, 4 at 7:55 a.m., for example. In the example as shown, a next regular data transmission between protocol converter 1 and system unit 8 will take place at 9:00 a.m.

At 8.05 a.m., protocol converter 1 receives e.g. a message containing a trouble report of the second heating installation HZ-B 3. When a trouble report is received, the protocol converter 1 shall, according to the invention, transmit a message to the system unit 8 without delay and shall not wait for the next data inquiry to be made by system unit 8. In the example as shown, the next data transmission initiated by system unit 8 will take place at 9 a.m. The protocol converter 1 drives modem 7 to set up a connection to the system unit 8 and pass on the received message. If this connection between protocol converter 1 and system unit 8 cannot be set up, the protocol converter 1 can also try to connect to other system units e.g. after a predetermined period of time, to pass on the received message to a system unit. System unit 8 can pass on the received message according to a handling schedule, e.g. in the form of a facsimile message, an e-mail or an SMS message, to the operating personnel in case the control station is not staffed at the time of message receipt. If this connection cannot be established even if other attempts are made, protocol converter 1 will send a given message.

In the example shown in FIG. 1, a facsimile message having a corresponding content is sent to facsimile device 11. Facsimile device 11 can be located e.g. in a head office or the home of a competent operator. The competent person can in this way be informed directly of the received trouble in one of the facilities even though no connection is possible between protocol converter 1 and system unit 8 at this time.

Of course, protocol converter 1 and system unit 8 can be connected and exchange data in many different ways. For example, both can be connected directly to a computer network (LAN) or they can be connected to each other directly via a null modem. Other embodiments are also conceivable in which the internet or other data transmission media can be used.

The operation and configuration data of facilities 2, 3, 4 can directly be checked and controlled by the operating staff in the control station by access to the database 10 of system unit 8 without a permanent connection to facilities 2, 3, 4 which are to be maintained and monitored having to be established. Of course, the given intervals mentioned in this example are only one possible example for a configuration of the apparatus according to the invention and can correspondingly be adapted to the requirements.

Figure 2:
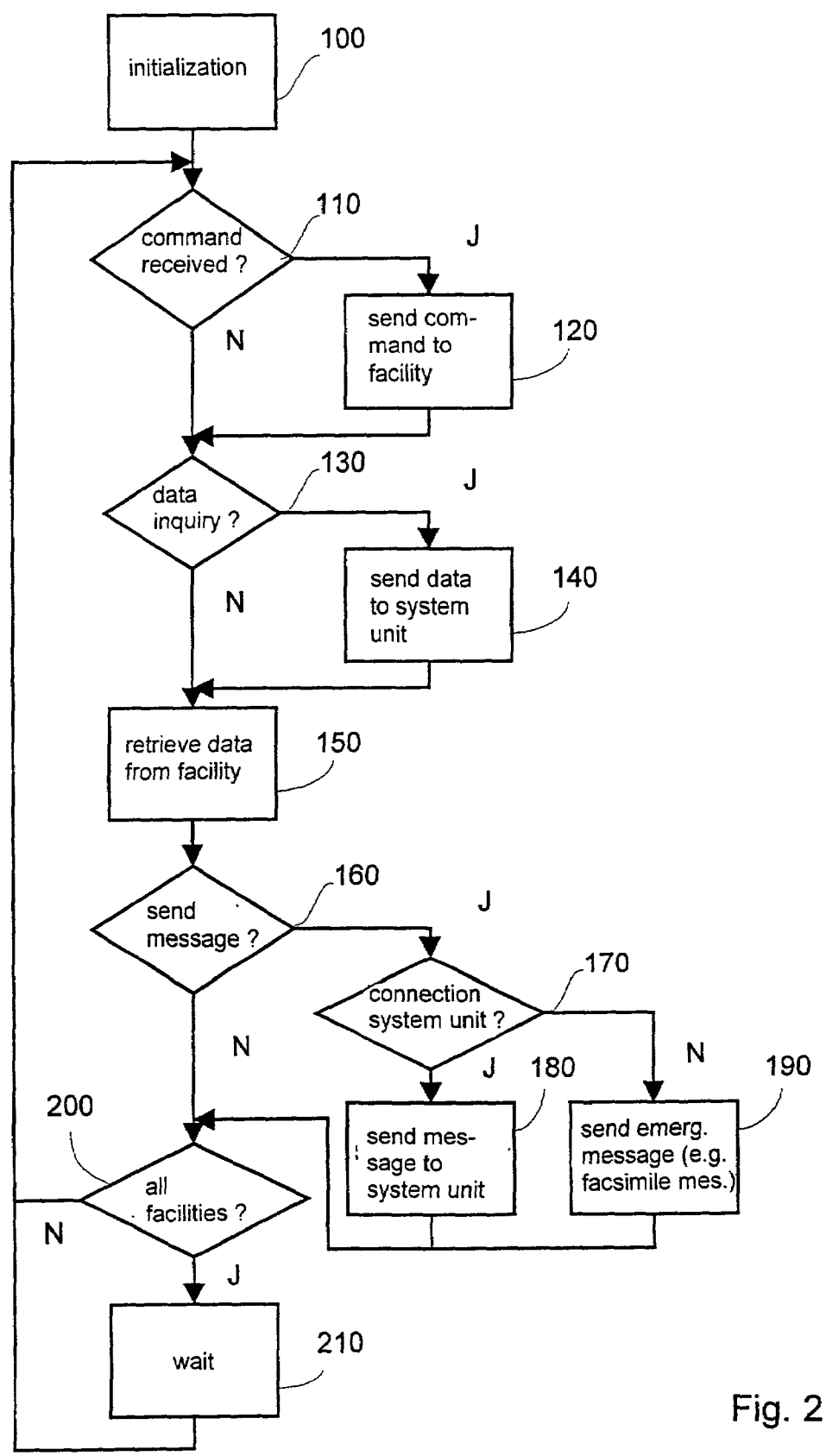
FIG. 2 shows a possible flow diagram illustrating the processing steps in a protocol converter.

FIG. 2 shows a possible time schedule for the processes of a protocol converter. In a step 100, the stored system configuration of the protocol converter is evaluated and the protocol converter is initialized. In this connection, a connected modem can be configured and the house bus system can be checked, for example.

In step 110, it is checked whether commands of system unit 8 were received for facilities 2, 3, 4 connected to protocol converter 1. If such commands were received, they are processed in step 120 and passed on to the corresponding facilities via bus system 5. Of course, it is also possible to pass on commands to all of the connected facilities via bus system 5 (broadcast). Furthermore, system unit 8 can, of course, also send commands to the protocol converter 1 per se. They have to be evaluated by protocol converter 1. In this way, it is possible to update the telephone number to be dialed for an emergency connection, for example.

In step 130, the protocol converter 1 checks whether a data inquiry was made by system unit 8. If an inquiry was made to receive data from connected facilities, the data to be retrieved are sent to system unit 8 in step 140. If no data have to be sent to system unit 8, a branch will be established directly to step 150.

In step 150, the given data determined in the configuration data are retrieved from a facility 2, 3, 4. For this purpose, a corresponding command is sent according to a second data transmission protocol to facility 2, 3, 4 via bus system 5. The addressed facility responds by sending the data to be retrieved via bus system 5. The thus received data are stored in memory 6 of protocol converter 1.

In step 160, it is checked whether due to the data or messages received from facilities 2, 3, 4 to be monitored an emergency report has to be sent to system unit 8.

If such a message has to be sent to system unit 8, it is tried in step 170 to set up a connection to system unit 8. If necessary, the attempt to establish a connection has to be repeated several times following a given interval (e.g. 10 times). It is also possible to attempt to set up a connection to another system unit 8.

If a connection to system unit 8 can be established, the protocol converter 1 will send, in step 180, a message, e.g. an emergency message of corresponding content, to system unit 8 according to the first data transmission protocol. This emergency message may contain the message received from the troubled facility and/or the reason why the emergency message was sent.

Data transmission to system unit 8 can be carried out according to an acknowledgement method in which the particular receiving system acknowledges receipt of a message.

If no connection can be established to system unit 8, a branch will be established from step 170 to step 190. In step 190, a predetermined emergency connection is activated by protocol converter 1 and a given message, e.g. a facsimile message, is sent. This facsimile message may contain the reason for the emergency message and a description regarding the current trouble of the connection to system unit 8.

In step 200, it is checked whether the special data from all of the facilities 2, 3, 4 to which an inquiry is to be made are already available. If data from facilities 2, 3, 4 still have to be retrieved in this run of a cycle, a branch back to step 110 will be established and the procedure is continued with the next facility. If an inquiry has already been made to all the facilities 2, 3, 4 connected to bus system 5, the procedure will be continued with step 210.

In step 210, a predetermined time is allowed to lapse before a new inquiry cycle is started. After e.g. 10 minutes, the procedure is continued with step 110 and with the inquiry of the first facility to which an inquiry is to be made. The order of facilities 2, 3, 4 to which an inquiry is to be made can be determined as desired when the protocol converter 1 is configured.

Figure 3:
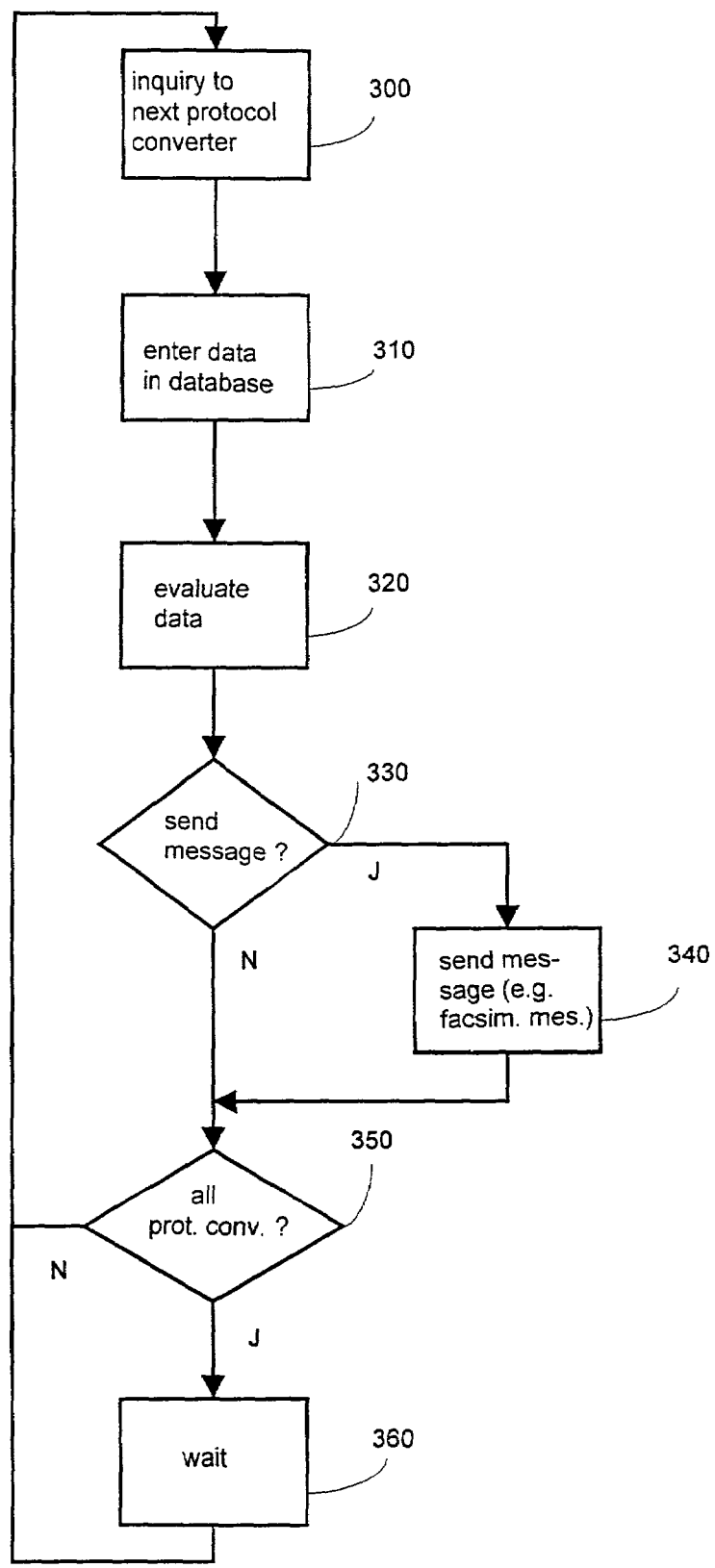
FIG. 3 shows a possible flow diagram illustrating the processing steps in a system unit.

FIG. 3 shows a possible procedural course in system unit 8, using an embodiment having several protocol converters. In step 300, the data of the facilities 2, 3, 4 to be monitored are retrieved by the first protocol converter 1. For this purpose, system unit 8 connects to protocol converter 1, i.e. modem 9, for example, is driven such that a dial-in connection is set up to modem 7 and to protocol converter 1 via a private or public telephone network. The connection can also be set up by means of a call-back procedure in which the connection is always established by the protocol converter 1 upon receipt of a call-back request. The system unit 8 sends corresponding commands to protocol converter 1 which, in turn, sends the requested data to system unit 8. Following the data exchange, the dial-in connection, if established beforehand, is disconnected.

If both system unit 8 and protocol converter 1 are connected to a data transmission network by fixed connections, e.g. a LAN, no temporary dial-in connection will be established. Only a logical connection between system unit 8 and protocol converter 1 is set up for the purpose of data transmission. This can be done by means of sockets for TCP, for example. Of course, connectionless transmission protocols, such as UDP, can also be used.

In step 310, the received data are entered in the database 10 of system unit 8. On account of the data available in database 10, an operator can check the state of facilities 2, 3, 4 to be monitored at any time without having to establish connections to individual facilities 2, 3, 4 and retrieve data.

In step 320, the received data are evaluated. For example, an extraordinary operating condition of a facility 2, 3, 4 can be detected. Furthermore, received measurement data, e.g. from heat counters or temperature sensors, can be analyzed. In step 330, it is determined whether based on the evaluated data a message has to be sent to an operator.

If necessary, such a message is sent in step 340. By means of this message, a competent operator can be informed of an extraordinary state, e.g. an existing trouble in a facility. The message can be sent e.g. in the form of an SMS message to the operator's mobile telephone. This is an easy way to inform the operator in every place and at any time.

In step 350, it is checked whether an inquiry has already been made to all of the protocol converters of the system. If an inquiry has still to be made to other protocol converters, a branch back to step 300 is established where the inquiry is continued with the next protocol converter. The order of the inquiry made to the protocol converters can be determined as desired and can be stored in system unit 8.

Following the inquiry made to all of the protocol converters, a predetermined time is allowed to lapse in step 360 before a new run for a new cycle is started. The given delay can be adjusted flexibly depending on the corresponding system requirements.

During the above shown operating steps, a message from the protocol converter 1 can be received at any time. Processing these messages is not shown here and can be performed by an interrupt routine, for example. Furthermore, reference is not made herein to special processing steps initiated by the user. The user can request an update of the present data at any time. In this case, system unit 8 will start an additional inquiry of the data to be retrieved from protocol converter 1. Furthermore, the user can input commands for certain facilities via the control desk of system unit 8 at any time. These commands are then transmitted by system unit 8 to the corresponding protocol converter 1 where they are passed on to the desired facility 2, 3, 4.

Figure 4:
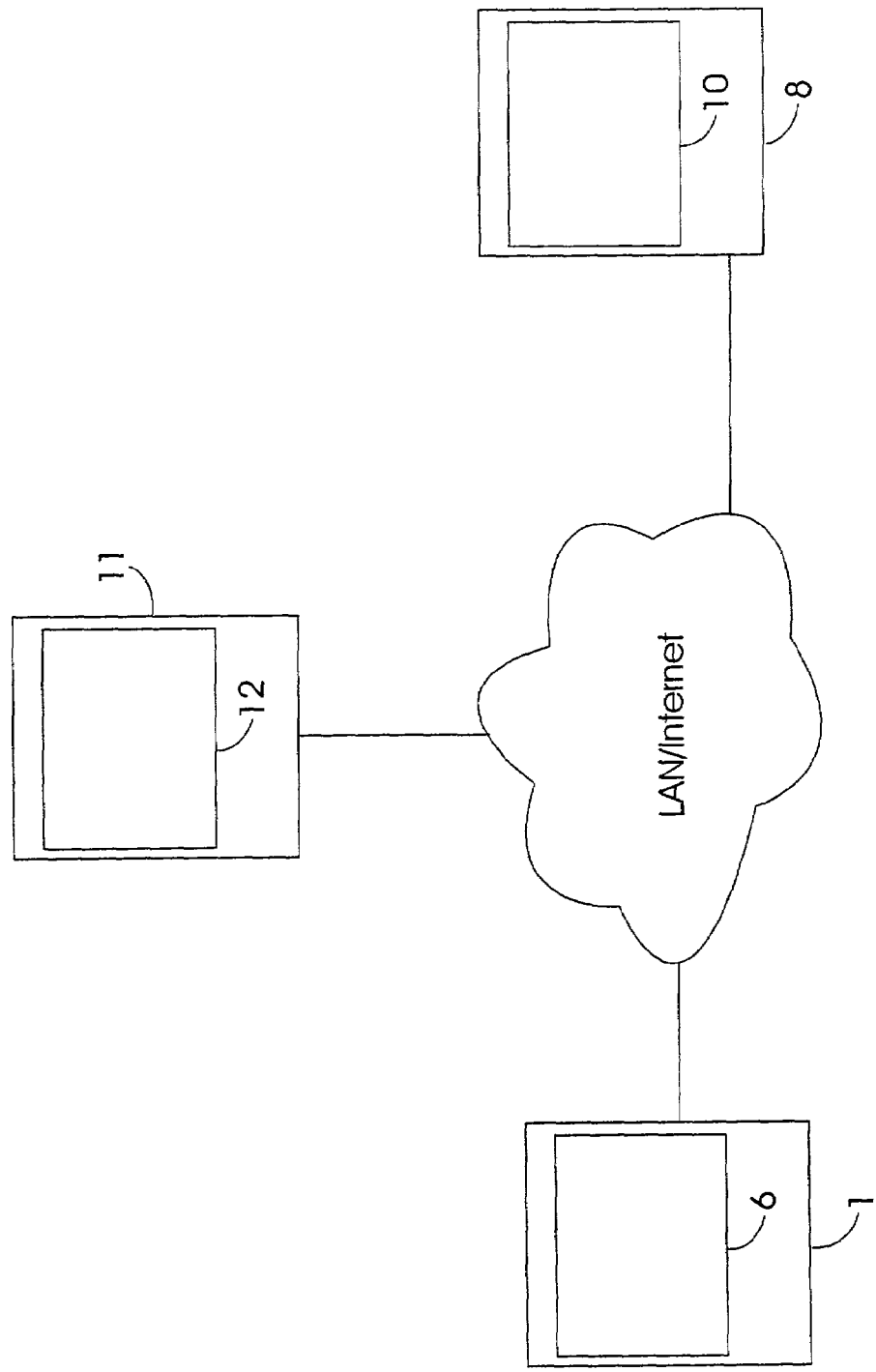
FIG. 4 shows a diagram of two system units directly connected to a LAN.

FIG. 4 shows a diagram of an embodiment having two system units 8, 11, which are directly connected to a LAN. Each of the two system units 8, 11 has a database 10, 12 for storing configuration, maintenance and operating data of facilities (not shown) connected to protocol converter 1. In this example, system unit 8 which is disposed e.g. in the control station, has a central database 10. System unit 11 is a portable system unit in the form of a notebook by means of which e.g. a field or maintenance engineer can diagnose and maintain heating installations in situ. The maintenance engineer can configure and maintain the heating installation by means of mobile system unit 11. Having concluded the maintenance work, the current configuration data are transmitted from database 12 to central database 10. The consistency of databases 10, 12 can be ensured in this way. The connection and communication between both system units 8, 11 can be made easily via the LAN or internet, e.g. by the Internet Protocol IP.

In another embodiment, e.g. system unit 8 can be disposed in the control station of the operator of the installation, whereas the second system unit 11 is disposed e.g. in the control station of the manufacturer of an installation. A multistage system for the parameterization and remote monitoring of heating installations can easily be created in this way. The operator of an installation conducts e.g. simple maintenance work himself and leaves more complicated maintenance and diagnostic work to the service staff of the installation manufacturer. Furthermore, it is possible to only staff the control station of the operator of an installation sometimes. At night and over the weekends, the remote monitoring is conducted by another control station which can be e.g. a service center of the installation manufacturer who as a center maintains and remotely monitors installations for many of his customers. Due to the use of internet for the communication between the individual system units 8, 11 such a distributed parameterization and remote monitoring of facilities 2, 3, 4 can be enabled in cost-effective manner.

In order to ensure secure access to system unit 8, 11 and protocol converter 1, corresponding access controls can be provided, e.g. by keywords. Only registered and authorized users and systems may access system unit 8, 11 and protocol converter 1. For example, an operator of an installation may permit the central service of the installation manufacturer to access his protocol converters 1 and system units 8, 11. Furthermore, the data traffic between the individual components of the apparatus can be enciphered.

Figure 5:
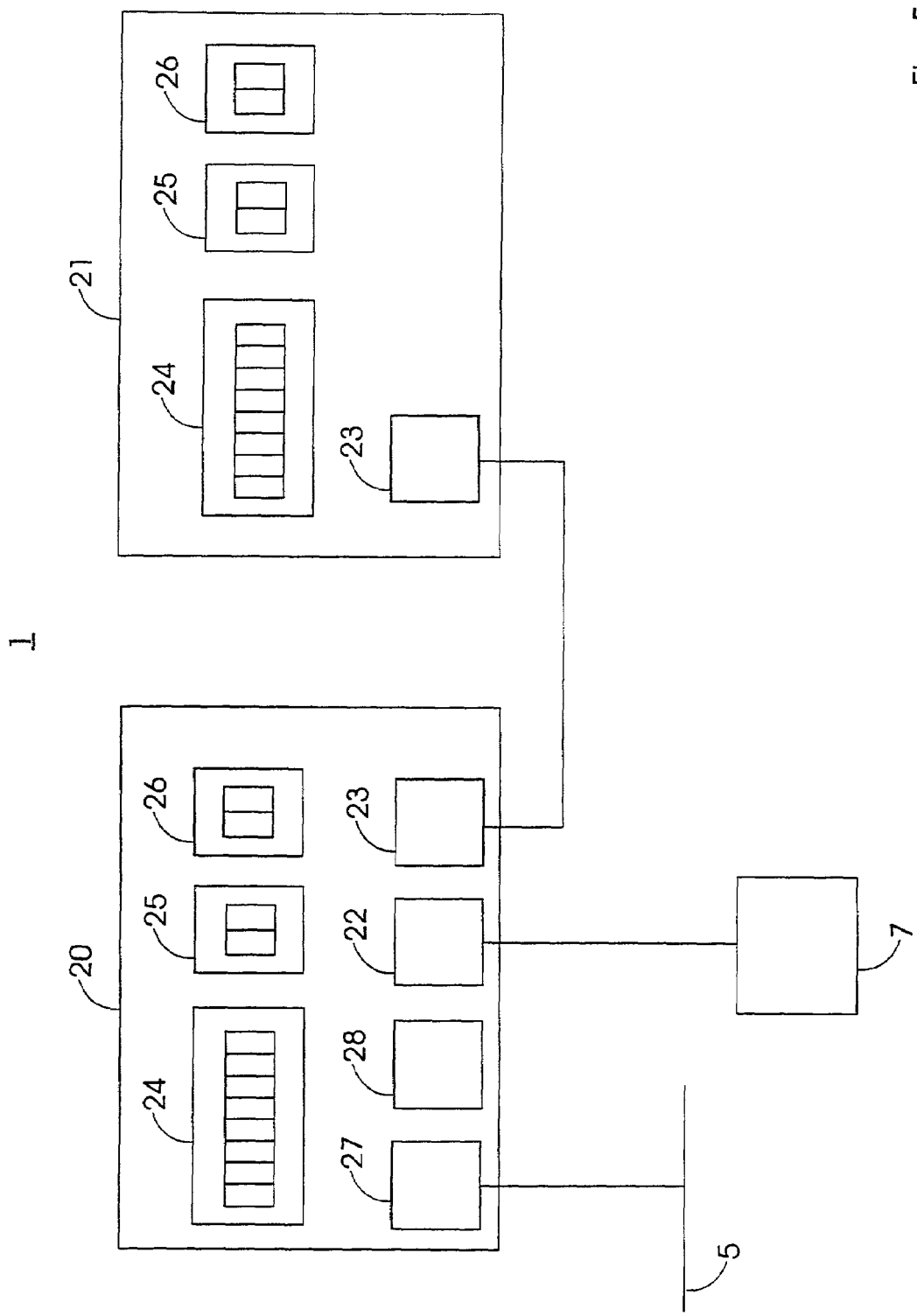
FIG. 5 shows a diagram for an embodiment of a protocol converter.

FIG. 5 shows a diagram for a possible embodiment of a protocol converter according to the invention.

The protocol converter 1 as shown can advantageously be composed of a basic module 20 and an expansion module 21. The basic module 20 has a modem interface 22 according to the RS 232 specification with V0.24 levels and with LED displays for dialing and connecting. The modem interface 22 is connected via a serial interconnecting cable to modem 7 connected to the protocol converter.

The basic module 20 and the expansion module 21 each have an interface 23, e.g. an I²C bus interface. Basic module 20 and expansion module 21 can easily be connected with each other via the I²C bus. In this way, a flexible design of a protocol converter 1 can be obtained. If required, further expansion modules can be added via the I²C bus, and an expanded protocol converter 1 having further connectivities can be created flexibly.

Both basic module 20 and expansion module 21 may have digital or analog inputs and outputs. They can be provided for direct connection of further facilities to the protocol converter 1. In the example as shown, basic module 20 and expansion module 21 each comprise a digital input device 24 having eight digital inputs. The digital inputs are suited for detecting operating conditions, for example.

In addition, basic module 20 and expansion module 21 each have an analog input facility 25. Each analog input facility 25 has two analog inputs for the connection of e.g. measuring instruments, such as temperature sensors. The analog inputs are provided with analog-to-digital converters which enable simple measurement data recording and a transmission of the digitized measurement data to system unit 8. The analog-to-digital converters have an accuracy of 8 bits, for example.

Basic module 20 and expansion module 21 are each provided with an output equipment having relay outputs for switching loads. The relay outputs can be provided for directly switching on and off devices, for example.

The basic module 20 can also have a LON interface 27 for connecting a LON bus system 5 to which facilities 2, 3, 4 are connected.

Furthermore, basic module 20 may have an optolink interface 28. This optical interface can be provided for the connection free of interferences of a mobile system unit 8 for the in situ maintenance and diagnosis.

In addition to the functional units shown in FIG. 5 the protocol converter 1 can include operating and display elements, such as operational status and fault indicators. A corresponding voltage supply shall also be provided.

The embodiment shown in FIG. 5 of a protocol converter 1 enables a flexible design. In the case of small installations which only have some facilities to be connected directly to the protocol converter 1, the protocol converter 1 according to the invention may consist of basic module 20 alone. Using one or several expansion modules 21, the protocol converter 1 can be expanded flexibly, and additional facilities can easily be connected to the protocol converter 1 for remote monitoring, parameterization and control. For this purpose, the protocol converter 1 is treated by system unit 8 like a facility connected to bus system 5 and itself may receive messages and commands by means of which an inquiry can be made to the directly connected devices or these devices can be influenced.

What is claimed is:

1. Apparatus for the remote monitoring and parameterization of facilities, in particular heating installations, comprising:
a system unit configured for data transmission according to a first data transmission protocol, the system unit also configured to monitor at least one facility and to communicate with other system units, wherein the system unit comprises a central database that is configured to be accessed by the other system units;
the at least one facility configured for the data transmission according to a second data transmission protocol;
a protocol converter for converting received data, the protocol converter including a memory configured to store predetermined data received from the at least one facility, the protocol converter being configured to convert data of the first data transmission protocol into data of the second data transmission protocol and data of the second data transmission protocol into data of the first data transmission protocol and to retrieve the predetermined data from the at least one facility at given time intervals, wherein after the receipt of the predetermined data or after request by the system unit, the protocol converter is further configured to control a data transmission device in order to establish a connection to the system unit, transmit the stored predetermined data by means of the data transmission device to the system unit and to induce the data transmission device to disconnect the connection to the system unit; and
a bus system for the data transmission according to the second data transmission protocol, to which the facilities and the protocol converter are connected;
wherein the controllable data transmission device allows the data transmission according to the first data transmission protocol between the system unit and the protocol converter.

2. Apparatus according to claim 1, wherein the facilities connectable to the bus system are heating, air conditioning and/or cooling installations and/or measuring or control devices for operating heating, air conditioning and/or cooling installations.

3. Apparatus according to claim 1, wherein the bus system is a house field bus and/or the second data transmission protocol is a LON protocol.

4. Apparatus according to claim 1, wherein the first data transmission protocol is a protocol on the basis of the Internet Protocol (IP), in particular the Simple Network Management Protocol SNMP, the Hypertext Transport Protocol HTTP, the Transport Protocol TCP or the LonWorks Network Protocol.

5. Apparatus according to claim 1, wherein the protocol converter sends data received from the system unit and destined for a certain facility via the bus system to the corresponding facility.

6. Apparatus according to claim 1, wherein the protocol converter activates a predetermined connection when a trouble report or maintenance report is received from one of the facilities.

7. Apparatus according to claim 1, wherein the protocol converter sends a predetermined message, in particular a facsimile, a voice message, an e-mail, or an SMS message, when a trouble report or maintenance report is received from one of the facilities and the connection to the system unit is troubled.

8. Apparatus according to claim 1, wherein the connection between the protocol converter and the system unit is established via an analog and/or a digital telephone line and comprises an analog modem, a GSM modem or an ISDN modem.

9. Apparatus according to claim 8, wherein the connection between the protocol converter and the system unit is established via a call-back procedure.

10. Apparatus according to claim 1, wherein the system unit establishes a connection to the protocol converter at given time intervals and retrieves predetermined data which were previously retrieved from the facilities and buffered by the protocol converter.

11. Apparatus according to claim 1, wherein the system unit establishes a connection to the protocol converter and/or sends data for a certain facility to the protocol converter and/or receives data of a certain facility from the protocol converter.

12. Apparatus according to claim 1, wherein the system unit comprises a database which contains the configuration, commissioning, maintenance and/or operation data of facilities and/or of the protocol converter, in particular trouble reports and maintenance reports.

13. Apparatus according to claim 12, wherein the system unit comprises an internet server and/or WAP server for the access to the database.

14. Apparatus according to claim 1, wherein the system unit sends a predetermined message, in particular a facsimile, a voice message, an e-mail or an SMS message, when a certain trouble report or maintenance report is received from one of the facilities.

15. Apparatus according to claim 1, wherein several system units establish connections to protocol converters and/or receive data from the protocol converters and/or send data to the protocol converters, the system units being connectable to each other via the internet.

16. Apparatus according to claim 15, wherein one of the system units comprises a central database to which the other system units report data changes and/or with which the databases of the other system units are collated.

17. Method for the remote monitoring and parameterization of facilities, in particular heating installations, comprising:

transmitting data according to a first data transmission protocol between a system unit and a protocol converter;

monitoring at least one facility with the system unit and communicating with other system units where the other system units access a central database of the system unit;

transmitting data according to a second data transmission protocol by at least one facility;

converting received data by a protocol converter wherein the protocol converter converts data of the first data transmission protocol into data of the second data transmission protocol and data of the second data protocol into data of the first data transmission protocol, stores data in a memory, retrieves predetermined data from at least one facility at given time intervals, stores the data received from the at least one facility in the memory, wherein after receipt of the predetermined data or after request by the system unit, the protocol converter controls a controllable data transmission device in order to establish a connection to the system unit, transmits the stored data by means of the data transmission device to the system unit, and induces the data transmission device to disconnect the connection to the system unit;

transmitting data according to the second data transmission protocol by a bus system to which the facilities and the protocol converter are connected; and transmitting data according to the first data transmission protocol between the system unit and the protocol converter by the controllable data transmission device.

18. The apparatus of claim 1, wherein the other system units include respective databases and are configured to send data updates to the central database and/or collate the respective databases with the central database.

19. The method of claim 17, wherein the other system units send data updates to the central database and/or collate respective databases of the other system units with the central database.

* * * * *